United States Patent
Leclercq et al.

(10) Patent No.: US 9,151,843 B2
(45) Date of Patent: Oct. 6, 2015

(54) METHOD AND SYSTEM FOR INDOOR GLOBAL NAVIGATION SATELLITE SYSTEM DETECTION UTILIZING LOW-EARTH ORBIT SATELLITE SIGNALS

(75) Inventors: Maxime Leclercq, Encinitas, CA (US); Ioannis Spyropoulos, La Jolla, CA (US); Nishant Kumar, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 794 days.

(21) Appl. No.: 13/546,794

(22) Filed: Jul. 11, 2012

(65) Prior Publication Data

US 2013/0106653 A1    May 2, 2013

Related U.S. Application Data

(60) Provisional application No. 61/552,699, filed on Oct. 28, 2011, provisional application No. 61/666,061, filed on Jun. 29, 2012.

(51) Int. Cl.

| G01S 19/34 | (2010.01) |
|---|---|
| G01S 19/05 | (2010.01) |
| G01S 19/26 | (2010.01) |
| G01S 19/24 | (2010.01) |

(52) U.S. Cl.
CPC ............... G01S 19/05 (2013.01); G01S 19/24 (2013.01); G01S 19/26 (2013.01); G01S 19/34 (2013.01)

(58) Field of Classification Search
CPC ......... G01S 19/34; G01S 19/24; G01S 19/26; G01S 19/05

USPC ..................................................... 342/357.74
See application file for complete search history.

(56) References Cited

U.S. PATENT DOCUMENTS

| 4,646,096 A * | 2/1987 | Brown .................. 342/357.25 |
|---|---|---|
| 5,471,146 A * | 11/1995 | Krayeski et al. ............. 324/637 |
| 5,956,619 A * | 9/1999 | Gallagher et al. ........... 455/12.1 |
| 7,042,392 B2 * | 5/2006 | Whelan et al. ........... 342/357.29 |
| 2001/0004586 A1* | 6/2001 | Choe et al. .................. 455/226.2 |
| 2006/0064725 A1* | 3/2006 | Rabinowitz et al. ............ 725/68 |
| 2008/0001819 A1* | 1/2008 | Cohen et al. ............. 342/357.16 |
| 2008/0018545 A1* | 1/2008 | Kaplan et al. .................. 343/713 |
| 2010/0265128 A1* | 10/2010 | Martens et al. .......... 342/357.25 |
| 2011/0238308 A1* | 9/2011 | Miller et al. .................. 701/216 |
| 2011/0258076 A1* | 10/2011 | Muirbrook ................. 705/26.41 |

* cited by examiner

Primary Examiner — Frank J McGue
(74) Attorney, Agent, or Firm — McAndrews, Held & Malloy (57) ABSTRACT

Methods and systems for indoor global navigation satellite system detection utilizing low Earth orbit satellite signals may comprise receiving low Earth orbit (LEO) RF satellite signals utilizing a LEO satellite signal receiver path (LEO Rx) in a wireless communication device comprising the LEO satellite signal receiver path and a medium Earth orbit satellite signal receiver path (MEO Rx). A received signal strength indicator (RSSI) may be measured for the received LEO signals and an expected received MEO signal strength may be calculated. A power level of the MEO Rx may be configured based on the calculated MEO signal strength by powering down when the calculated expected MEO signal strength is below a threshold level for MEO positioning purposes and/or powered up when it increases above the threshold level. The RSSI may be measured at a plurality of points along the LEO Rx.

20 Claims, 8 Drawing Sheets

METHOD AND SYSTEM FOR INDOOR GLOBAL NAVIGATION SATELLITE SYSTEM DETECTION UTILIZING LOW-EARTH ORBIT SATELLITE SIGNALS

CROSS-REFERENCE TO RELATED APPLICATIONS/INCORPORATION BY REFERENCE

This application makes reference to and claims priority to U.S. Provisional Application Ser. No. 61/552,699 filed on Oct. 28, 2011 and U.S. Provisional Application Ser. No. 61/666,061 filed on Jun. 29, 2012.

Each of the above stated applications is hereby incorporated herein by reference in its entirety.

FIELD OF THE INVENTION

Certain embodiments of the invention relate to wireless communication. More specifically, certain embodiments of the invention relate to a method and system for indoor global navigation satellite system detection utilizing low Earth orbit satellite signals.

BACKGROUND OF THE INVENTION

Global navigation satellite systems (GNSS) such as the NAVSTAR global positioning system (GPS) or the Russian GLONASS provide accurate positioning information for a user anywhere on Earth that GNSS signals may be received. GNSS satellites are medium earth orbit satellites, about 12,000 miles above the surface. Highly accurate GNSS clock signals from these satellites may be used to accurately determine the position of a receiver.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for indoor global navigation satellite system detection utilizing low Earth orbit satellite signals, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for indoor global navigation satellite system detection utilizing low Earth orbit satellite signals. Exemplary aspects of the invention may comprise receiving LEO RF satellite signals utilizing a LEO satellite signal receiver path in a wireless communication device comprising the low Earth orbit (LEO) satellite signal receiver path and a medium Earth orbit (MEO) satellite signal receiver path. A received signal strength indicator (RSSI) may be measured for the received LEO RF satellite signals and an expected received MEO signal strength may be calculated based on the measured RSSI. A power level of the MEO satellite signal receiver path may be configured based on the calculated MEO signal strength. The MEO satellite signal receiver path may be powered down when the calculated expected MEO signal strength is below a threshold level for MEO positioning purposes. The MEO satellite signal receiver path may be powered up when the calculated expected MEO signal strength increases above a threshold level for MEO positioning purposes. The RSSI may be measured at a plurality of points along the LEO satellite signal receiver path. RF circuitry, clock circuitry, and/or processing circuitry in the MEO satellite signal receiver path may be powered down for the configuring of the power level. In-phase and quadrature signals may be processed in the LEO and/or MEO satellite signal receiver paths. The wireless communication device may be controlled by a reduced instruction set computing (RISC) central processing unit (CPU).

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1A:
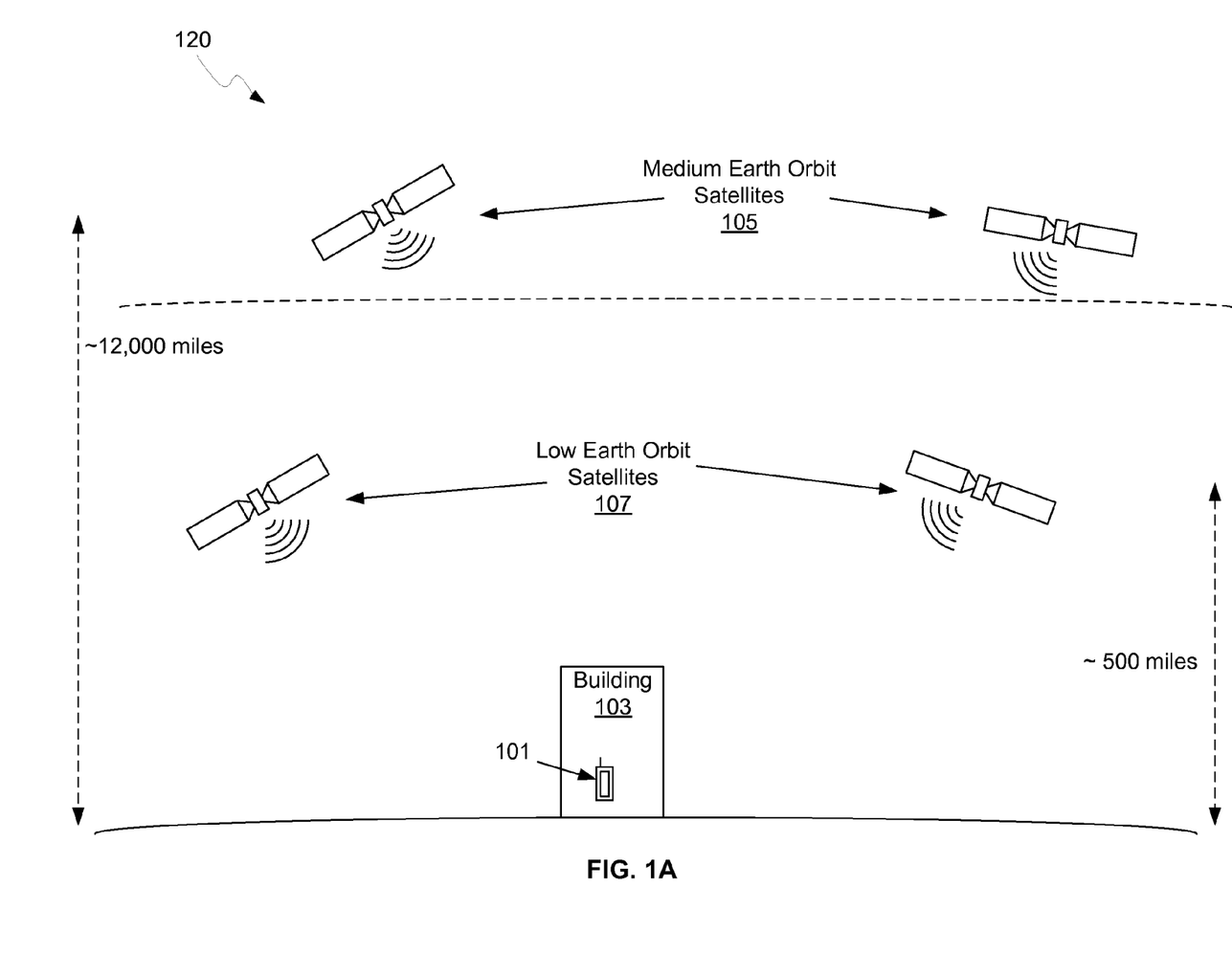
FIG. 1A is a diagram illustrating an exemplary wireless device with a global navigation satellite system, in accordance with an embodiment of the invention.

FIG. 1A is a diagram illustrating an exemplary wireless device with a global navigation satellite system, in accordance with an embodiment of the invention. Referring to FIG. 1A, there is shown a satellite navigation system 100 comprising a wireless communication device 101, a building 103, medium Earth orbit (MEO) satellites 105, and low Earth orbit (LEO) satellites 107. There is also shown the approximate height in miles of medium Earth and low Earth satellites of ~12,000 miles and ~500 miles, respectively.

The wireless communication device 101 may comprise any device or vehicle (e.g. smart phone) where its user may desire to know the location of such device or vehicle. The handheld communication device 101 may comprise a global navigation satellite system (GNSS) receiver having a configurable RF path that may be operable to receive medium Earth orbit (MEO) satellite signals and low Earth orbit (LEO) satellite signals. In another exemplary scenario, the wireless communication device 101 may comprise two RF paths to receive different satellite signals.

The MEO satellites 105 may be at a height of about 12,000 miles above the surface of the Earth, compared to about 500 miles above the surface for the LEO satellites 107. Therefore, the signal strength of LEO satellite signals is much stronger than MEO satellite signals. The LEO satellites 107 may typically be used for telecommunication systems, such as satellite phones, whereas the MEO satellites 105 may be utilized for location and navigation applications.

In certain circumstances, MEO signals, such as GPS signals, may be attenuated by buildings, such as the building 103, or other structures to such an extent that GPS receivers cannot obtain a lock to any GPS satellites. However, due to the stronger signal strength of LEO satellite signals, the LEO signals may be utilized by devices to supplement or substitute the MEO systems in the devices. However, the frequencies utilized for MEO and LEO satellite communication are not the same, so a conventional GPS receiver cannot process LEO signals such as Iridium signals.

In an exemplary embodiment, the wireless communication device 101 may be operable to receive both LEO satellite signals, such as Iridium signals, and MEO signals, such as GPS signals. In this manner, the receiver may be able to determine the user's location despite having high attenuation of GPS signals to below that of the sensitivity of the receiver. Thus, the wireless communication device 101 may be able to accurately determine its location by receiving either or both Iridium and GPS satellite signals. This may be enabled by utilizing separate RF paths, one path configured to receive MEO signals and the other path configured to receive LEO satellite signals.

In an exemplary scenario, the two separate RF paths may share some front-end components, such as an antenna, low-noise amplifier (LNA), and a splitter, for example. In this scenario, the shared front-end components may comprise enough bandwidth to process both MEO and LEO signals. In another exemplary scenario, the wireless device may utilize separate front-end components. Furthermore, in instances where only one type of signal is to be received, the inactive RF path may be powered down to conserve power.

In yet another exemplary scenario, the separate RF paths may be time-division duplexed (TDD), or selectively enabled, such that both MEO and LEO signals may be received, but at alternating times. This may enable MEO-assisted LEO positioning or LEO-assisted MEO positioning, for example. The wireless communication device 101 may comprise a blanking or switching module for enabling TDD signal reception, where the TDD process may be carried out in the digital domain. For example, the MEO, or GPS, processing path may be blanked, i.e. set to and held at the last sampled value or held at one or more preset values, so that the MEO demodulator may retain its synchronization for later locking onto MEO satellite signals while the LEO path receives and demodulates LEO signals.

In an exemplary embodiment, the wireless device 101 may be operable to determine whether a MEO satellite signal (e.g. GPS) signal has enough signal strength for the wireless device 101 to lock on to by measuring the signal strength of LEO satellite signals (e.g. Iridium). In this manner, the wireless device 101 does not waste excessive power searching for a MEO (GPS) signal when inside a structure such as the building 103 where it is more difficult for MEO signals to penetrate. Thus, since the wireless device 101 has knowledge of the expected signal strength of a MEO signal with a measured LEO signal, it may leave the MEO RF path off or in a low power state.

A received signal strength indicator (RSSI) may be utilized to measure the received LEO signal, which may then be compared to an expected signal strength. This comparison may then be correlated to an expected MEO signal strength in that location. The expected signal strengths may be determined from positions determined utilizing the LEO signals, or from a recently determined position, and expected signal strengths of satellites servicing that region at that time. In addition, MEO vs LEO signal strength calibrations may be made at time of manufacture and/or product development of the wireless device 101.

Figure 1B:
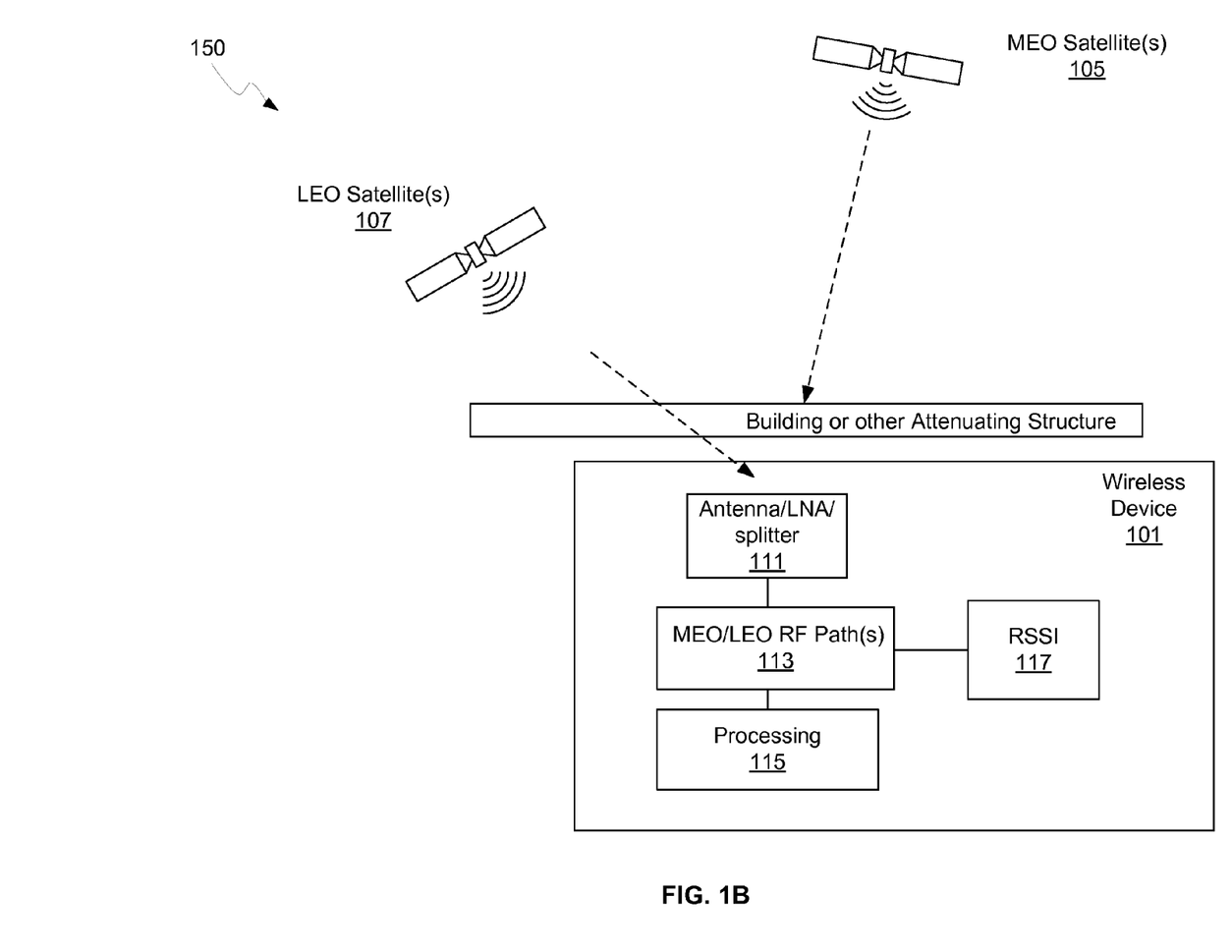
FIG. 1B is a block diagram of an exemplary dual mode global navigation satellite system in accordance with an embodiment of the invention.

FIG. 1B is a block diagram of an exemplary dual mode global navigation satellite system in accordance with an embodiment of the invention. Referring to FIG. 1B, there is shown a global navigation satellite system 150 comprising the wireless communication device 101, MEO satellites 105, and LEO satellites 107.

The wireless communication device 101 may comprise common RF front end elements such as an antenna/low-noise amplifier (LNA)/signal splitter 111. The wireless device 101 may also comprise configurable or dual MEO/LEO RF paths 113, a processing block 115, and a received signal strength indicator (RSSI) block 117.

The configurable or dual MEO/LEO RF paths 113 may comprise amplification, down-conversion, filtering, and analog-to-digital conversion capability for received MEO and LEO signals. Portions of the configurable or dual MEO/LEO RF paths 113 may be selectively enabled or disabled utilizing the processing block 115 to conserve power when insufficient signal strength is present.

The RSSI block 117 may be operable to measure the signal strength of the received LEO signal and may communicate the result to the processing block.

Since LEO satellites are at a much lower altitude, their signal strength is typically much stronger than MEO satellite signals. Accordingly, LEO signals are typically of sufficient strength for positioning even within an attenuating structure such as a building.

The measured signal strength of LEO signals may be used to determine the expected signal strength of MEO (GPS) signals that may be present, given that attenuation of the two frequencies are similar for any blocking structures that may be present. In this manner, the RSSI block may be utilized as a GPS signal indicator without the need to power up the MEO (GPS) RF path as well as the associated demodulation and position engine circuitry.

The processing block 115 may comprise one or more CPUs (e.g. a RISC CPU) for demodulating signals and calculating positioning information, for example, and as such may comprise at least one positioning engine. In an exemplary scenario, the processing block 115 may comprise a MEO satellite signal positioning engine and a LEO satellite positioning engine. Furthermore, the processing block 115 may be operable to compare the RSSI of received LEO satellite signals to expected signal strengths to determine when to use LEO positioning versus MEO positioning.

In an exemplary embodiment, the wireless device may be operable to determine whether a MEO satellite (e.g. GPS) signal has enough signal strength, as a result of the signal degradation from the intervening building or other attenuating structure, for the wireless device 101 to lock on to by measuring the signal strength of LEO satellite signals (e.g. Iridium). In this manner, the wireless device 101 does not waste excessive power searching for a MEO (GPS) signal when inside a structure where it is more difficult for MEO signals to penetrate. Thus, since the wireless device 101 has knowledge of the expected signal strength of a MEO signal with a measured LEO signal, it may leave the MEO RF path off or in a low power state. Utilizing LEO RSSI may enable a MEO (GPS) signal detection capability without the need for powering up the MEO RF and processing circuitry.

Additionally, when the wireless device 101 enters a building or structure involving attenuation as mentioned above, the processing block 115 may cause the MEO RF path to turn off or go into a low power state. In a similar manner discussed above, the RSSI block 117 may be utilized as a GPS signal indicator to enable the processing block 115 to determine when to cause the MEO RF path to wake-up from the off or low power state, and enter an awake or signal acquisition state. In this regard, the wireless device 101 may save power by remaining in the off or low power state for the entire duration of the attenuation, and only attempt to acquire and lock onto MEO signals when the RSSI block 117 indicates that signal attenuation has sufficiently abated (e.g. when the wireless device 101 or vehicle carrying the device exits the building or structure).

Figure 2A:
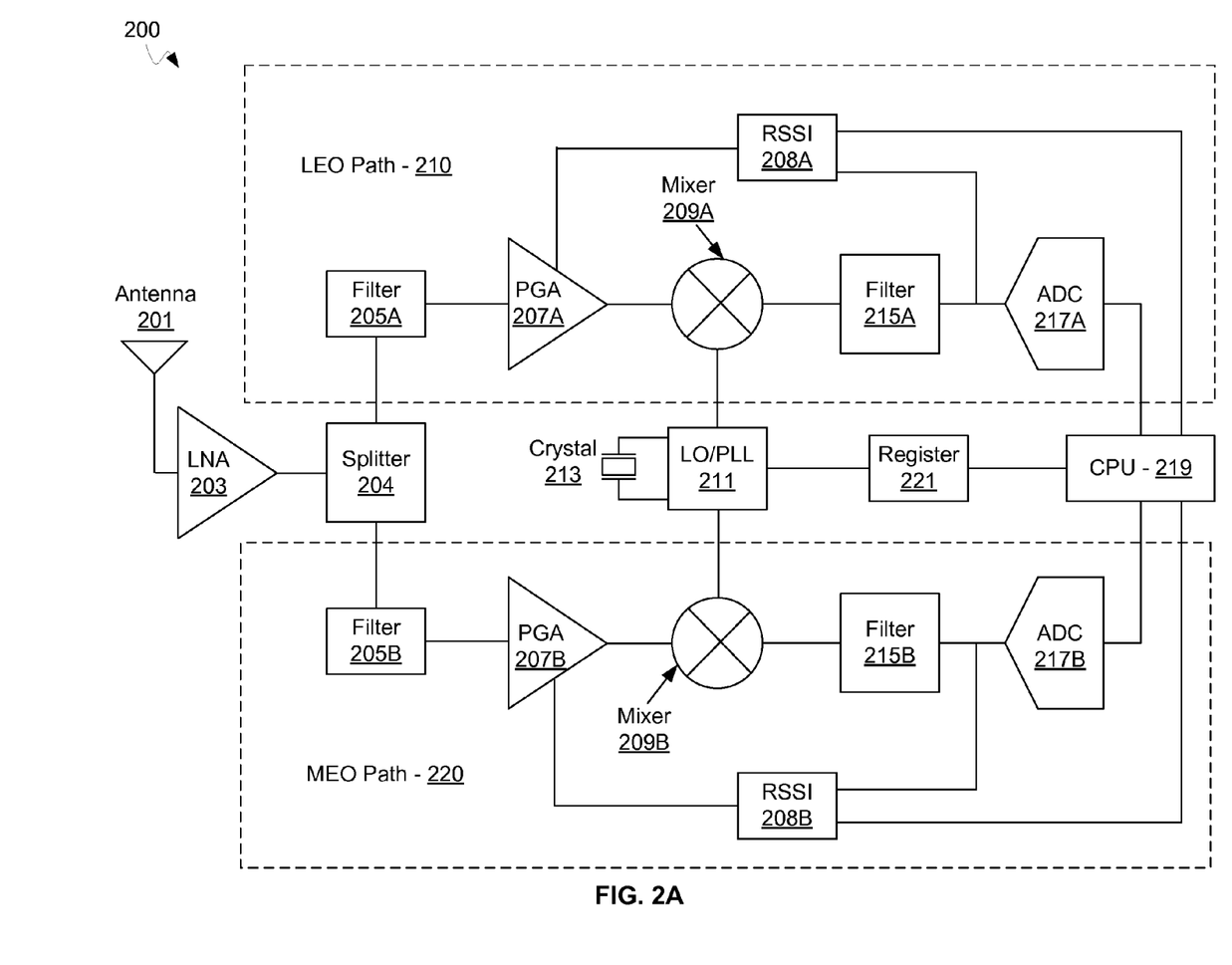
FIG. 2A is a diagram illustrating an exemplary dual mode radio frequency receiver, in accordance with an embodiment of the invention.

FIG. 2A is a diagram illustrating an exemplary dual mode radio frequency receiver, in accordance with an embodiment of the invention. Referring to FIG. 2A, there is shown a receiver 200 comprising an antenna 201, a low noise amplifier (LNA) 203, a signal splitter 204, a LEO path 210, a MEO path 220, a local oscillator (LO)/phase locked loop (PLL) 211, a crystal oscillator 213, a central processing unit 219, and a register 221.

The LEO path 210 and MEO path 220 may comprise similar components, configured for different frequencies as needed, such as a programmable gain amplifiers (PGAs) 207A and 207B, receive signal strength indicator modules (RSSI) 208A and 208B, mixers 209A and 209B, filters 215A and 215B, and analog-to-digital converters (ADCs) 217A and 217B.

The antenna 201 may be operable to receive RF signals for subsequent processing by the other elements of the receiver 200. The antenna 201 may comprise a single antenna with wide enough bandwidth to receive both LEO and MEO signals, may comprise a tunable antenna to cover the desired frequency range, or may comprise more than one antenna for receiving signals, each for receiving signals in one of a plurality of frequency ranges.

The LNA 203 may be operable to provide amplification to the signals received by the antenna 201, with the amplified signal being communicated to the splitter 204. The LNA 203 may have a wide enough bandwidth to amplify both MEO and LEO satellite signals or may comprise parallel gain stages for LEO and MEO signals.

The signal splitter 204 may be operable to communicate part of the signal received from the antenna 201 to the LEO path 210 and part to the MEO path 220. This may be achieved by splitting the signal at a certain percentage to each path, such as 50%/50%, for example, or may split the received RF signal based on frequency, such that only MEO signals are communicated to the MEO path 220 and only LEO signals are communicated to the LEO path 210. In another exemplary scenario, separate front ends may be utilized to receive the two types of signals, i.e. a separate antenna and LNA for LEO and MEO signals that communicate the respective signals to the LEO path 210 and the MEO path 220.

The filters 205A and 205B may comprise active or passive filters and may be operable to attenuate signals at frequencies outside a desired range and allow desired signals to pass. For example, the filter 205A may pass LEO satellite signals while filtering out MEO signals.

The PGAs 207A and 207B may provide amplification to signals received from the filters 205A and 205B, and may be configured to operate at MEO or LEO frequencies, or may operate over both frequency ranges, for example. The PGAs 207A and 207B may be configured by a processor, such as the CPU 219.

The filter modules 205A and 205B may comprise active and/or passive filters for removing unwanted signals while allowing desired signals to pass to the PGAs 207A and 207B. In an exemplary scenario, the filter modules 205A and 205B comprise surface acoustic wave (SAW) filters.

The RSSI modules 208A and 208B may comprise circuitry for determining the magnitude of a received signal, and may sense signal strengths at the PGAs 207A or 207B or for down-converted signals after the filters 215A and 215B or even after processing by the CPU 219, for example. Accordingly, the RSSI modules 208A and 208B may be operable to sense signal strengths at any point along the RF paths in the receiver 200.

The mixers 209A and 209B may comprise circuitry that is operable to generate output signals at frequencies that are the sum and the difference between the input RF signals and the local oscillator signal received from the LO/PLL 211. In an exemplary scenario, the LEO path 210 and the MEO path 220 may comprise two paths each to enable the reception of in-phase and quadrature (I and Q) signals. Accordingly, the mixers 209A and 209B may each comprise two mixers, each receiving LO signals with 90 degree phase difference to the other mixer of the pair.

In another exemplary scenario, the mixers 209A and 209B may down-convert the received RF signals to an intermediate frequency (IF) for further processing, as opposed to down-converting directly to baseband. In this scenario, the filter modules 215A and 215B may comprise a bandpass filter that is configured to pass the desired IF signals while filtering out the undesired low and high frequency signals.

The LO/PLL 211 may comprise circuitry that is operable to generate RF signals to enable down-conversion of RF signals received by the mixers 209A and 209B. The LO/PLL 211 may comprise a voltage-controlled oscillator, for example, with a PLL to stabilize the frequency of the output signal communicated to the mixers 209A and 209B. In an exemplary scenario, the LO/PLL 211 may generate a plurality of LO signals for down-converting I and Q signals in the LEO path 210 and the MEO path 220.

The crystal oscillator 213 may comprise a stable clock source for the receiver 200, and may comprise a piezoelectric crystal, for example, that outputs a stable clock signal at a given temperature. The crystal oscillator 213 may comprise a source for the various LO signals to be communicated to the mixers via the LO/PLL 211.

The ADCs 217A and 217B may comprise circuitry that is operable to convert analog input signals to digital output signals. Accordingly, the ADCs 217A and 217B may receive baseband or IF analog signals from the mixers 209A and 209B and may generate digital signals to be communicated to the CPU 219 for further processing.

The CPU 219 may comprise a processor similar to the processor 113, for example, described with respect to FIG. 1B. Accordingly, the CPU 219 may be operable to control the functions of the receiver 200 and may process received baseband or IF signals to demodulate, decode, and/or perform other processing techniques to the received data. Other processing techniques may comprise positioning calculations based on received satellite signals. The CPU 219 may thus be operable to demodulate and decode both MEO and LEO satellite data, such as GPS and Iridium data.

The CPU 219 may receive RSSI information from the RSSI modules 208A and 208B or may calculate RSSI information from magnitude data from the RSSI modules 208A and 208B and may control the gain of the various gain stages in the Rx paths. Similarly, the CPU may control the LO/PLL 211 via the register 221.

The register 221 may comprise a memory register for storing a configuration to be communicated to the LO/PLL to down-convert MEO and/or LEO signals. The register 221 may communicate an output signal to the LO/PLL 211 that indicates the desired frequency signals to down-convert to received RF signals to IF or baseband.

In an exemplary scenario, the receiver 200 may be operable to receive both MEO and LEO satellite signals for positioning purposes. In this manner, the wireless device that comprises the receiver 200 may be capable of determining its position even within a structure that attenuates GPS signals.

In an exemplary scenario, 2-5 bursts from an LEO satellite may be received by the wireless device over a few seconds. The burst may be down-converted and demodulated to extract an accurate clock and satellite orbital data. These may be communicated to a position engine that may calculate the position. Furthermore, once the satellite orbital data is extracted, the Doppler shift may be calculated from the burst intervals compared to the known actual burst intervals, which are known for each satellite.

The extracted clock may be utilized to calibrate the LO/PLL 211 and/or TCXO timing circuits 213 in the wireless communication device 101. This may allow the RF receive paths 210 and 220 to power down occasionally, particularly the MEO (e.g. GPS) RF path 220, since it would not be needed to calibrate the timing circuits.

In an exemplary scenario, the RSSI module 208A may be operable to monitor the signal strength of received LEO signals. An expected MEO signal strength may be determined from the measured LEO signal RSSI as attenuation of LEO and MEO signals are typically essentially similar. In this manner, the MEO path 220 may be powered down when the expected MEO signal strength is below a threshold level or powered up when above a threshold and MEO (e.g. GPS) positioning is desired. In this manner, the receiver 200 is operable to determine MEO signal strength without powering up the MEO receive path 220, greatly reducing power requirements.

Figure 2B:
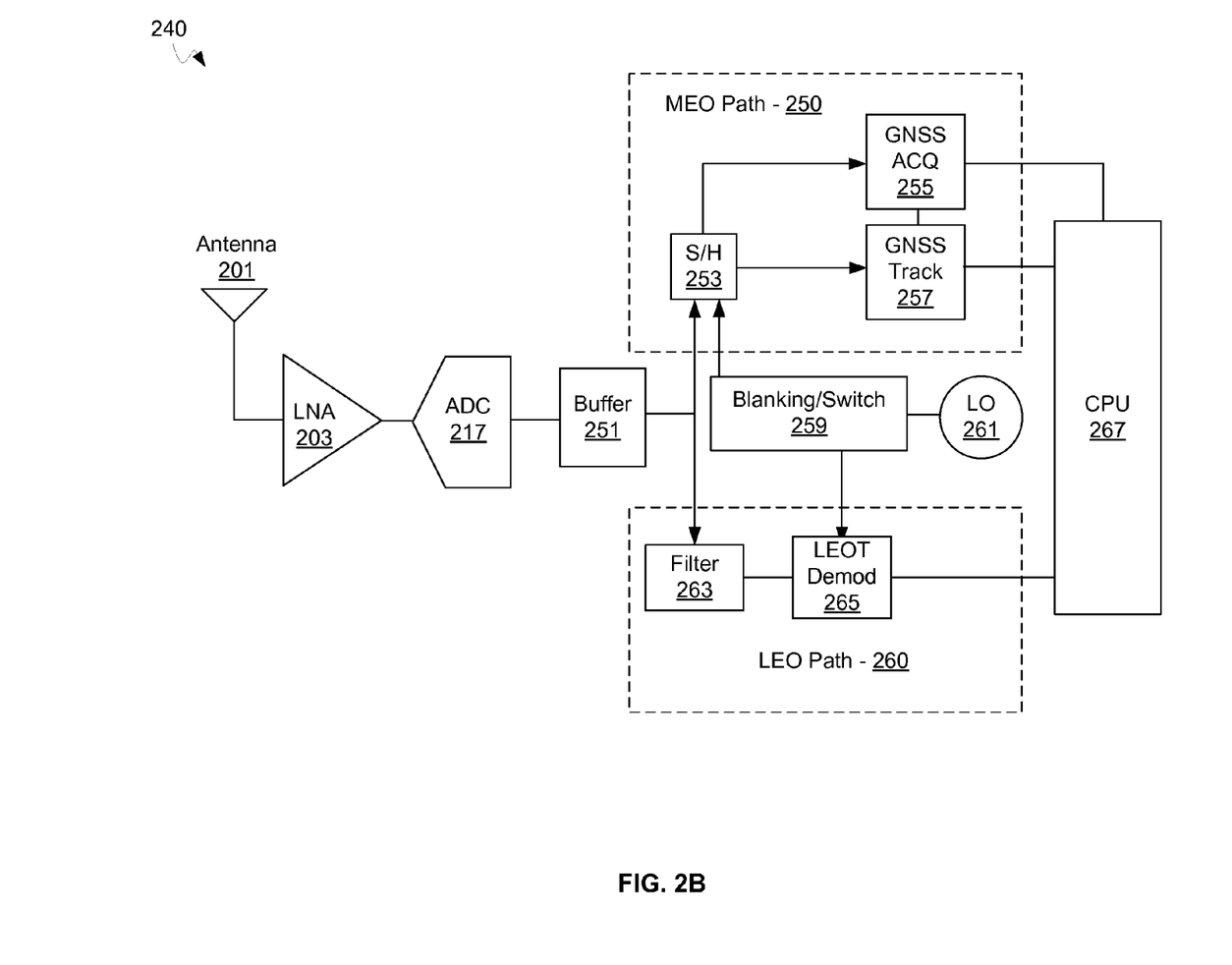
FIG. 2B is a block diagram illustrating a dual-mode time-division duplex satellite receiver, in accordance with an embodiment of the invention.

FIG. 2B is a block diagram illustrating a dual-mode time-division duplex satellite receiver, in accordance with an embodiment of the invention. Referring to FIG. 2B, there is shown an exemplary receiver 240 comprising an antenna 201, a low-noise amplifier (LNA) 203, an analog-to-digital converter (ND) 217, a buffer 251, and two RF receive paths, a MEO path 250, and a LEO path 260. There is also shown a blanking/switch module 259, a LO/PLL 261 and a central processing unit (CPU) 267.

The MEO path 250 may comprise a sample and hold (S/H) module 253, a GNSS acquisition module 255, and a GNSS tracking module 257. The S/H module 253 may be operable to sample the digital signal from the buffer 251, and hold the sampled value for a configurable time, which may be communicated to the GNSS acquisition module 255 and the GNSS tracking module 257. The S/H module 253 may thus act as a gatekeeper for data to the GNSS acquisition module 255 and the GNSS tracking module 257. This may enable the receiver 250 to switch between MEO and LEO signals without losing a MEO value when receiving LEO signals, for example, and avoid the divergence of the output of the GNSS acquisition module 255 and the GNSS tracking module 257. In another exemplary scenario, the S/H module 253 may output a constant value, a string of zeroes, for example, or any known patter to avoid divergence of the output of the GNSS acquisition module 255 and the GNSS tracking module 257.

The GNSS acquisition module 255 may be operable to acquire a lock to one or more GNSS satellites, which may allow the GNSS tracking module 257 to determine and track the location of the receiver. The GNSS acquisition module 255 may detect LEO frequency signals above a threshold signal strength and extract an accurate clock by determining the code-division multiple access (CDMA) collision avoidance (CA) code for the received data. A determined satellite ID and C code may be used by the GNSS tracking module 257 for accurate positioning purposes.

Similarly, the LEO path 260 may comprise a filter 263 and a LEO timing signal demodulator module 265. The LEO timing signal demodulator module 265 may receive filtered MEO signals from the filter 263 and may demodulate the received signal to an accurate clock from the transmitting satellite. This accurate clock along with information regarding the satellite orbit may be utilized for positioning. In this manner either MEO or LEO signals, or both, may be utilized for positioning purposes.

The LEO timing demodulator 265, the GNSS acquisition module 255, and the GNSS tracking module 257 may communicate output signals to the CPU for further processing or use of the determined timing and/or positioning data.

The blanking/switching module 259 may be operable to provide the TDD function for the receiver, switching the LEO path 260 on and off and blanking the MEO path 250 by configuring the output of the S/H module 253 to retain the previous data to the GNSS acquisition module. The LO/PLL 261 may provide a timing signal for the blanking/switch module.

The filter 263 may be operable to filter out unwanted signals allowing the desired satellite RF signal to pass to the LEOT demodulator module 265. The LEO timing demodulator may be operable to extract an accurate timing signal from the received LEO signals, which along with satellite ephemeris data, may be utilized by the CPU 267 for positioning purposes.

The CPU 267 may be operable to monitor the LEO signal strength at the S/H module 253 and determine an expected MEO signal strength based on a known signal strength ratio and expected signal strength with no attenuation. In this manner, the MEO path may remain in a powered down state except when LEO signal strength indicates that the MEO signal strength should be sufficient for positioning purposes when desired.

Figure 3:
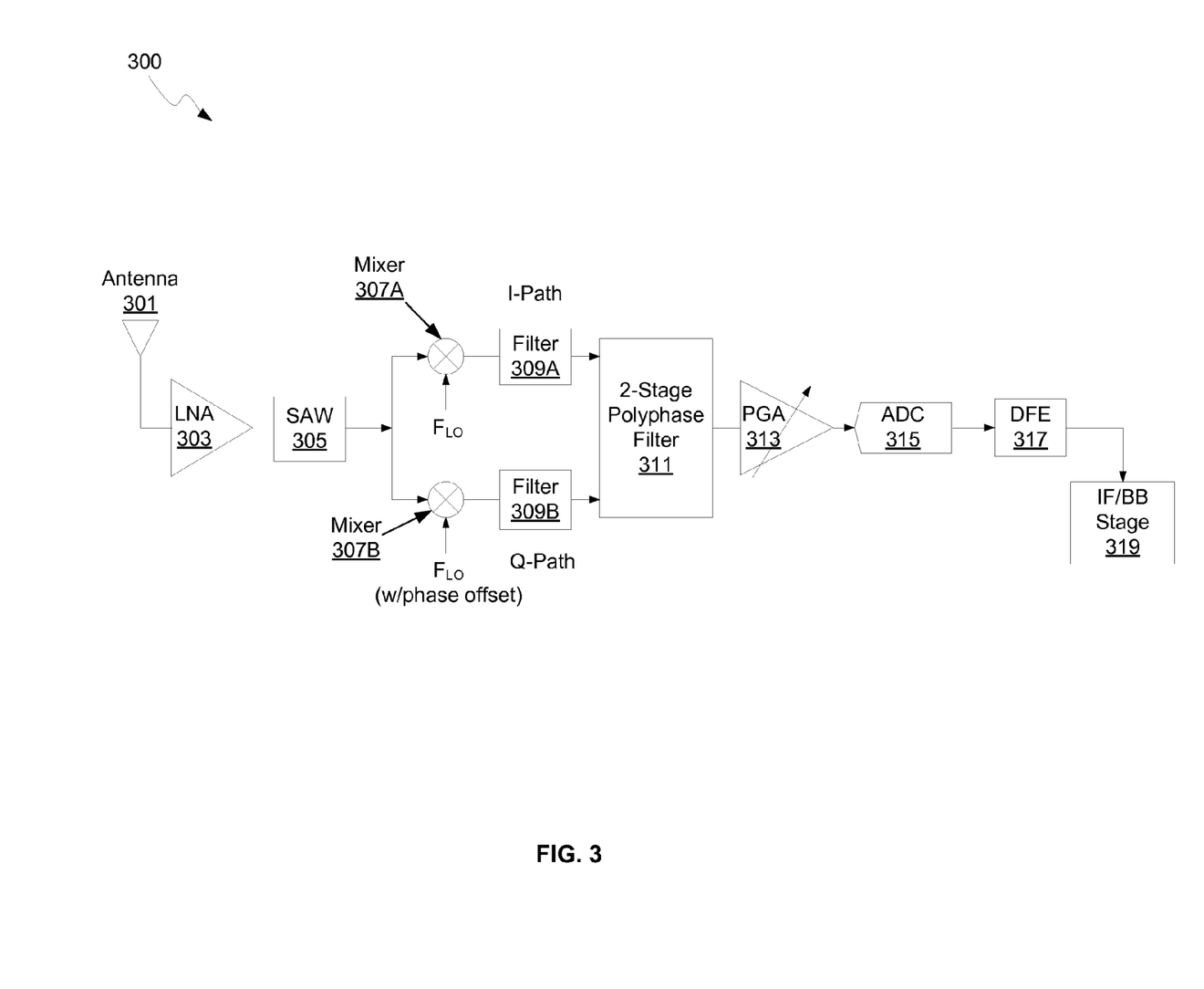
FIG. 3 is a diagram illustrating an exemplary in-phase and quadrature RF front end, in accordance with an embodiment of the invention.

FIG. 3 is a diagram illustrating an exemplary in-phase and quadrature RF front end, in accordance with an embodiment of the invention. Referring to FIG. 3, there is shown the I and Q RF path 300 comprising an antenna 301, an LNA 303, a SAW filter 305, mixers 307A and 307B, filters 309A and 309B, a 2-stage polyphase filter 311, a PGA 313, an ADC 315, a digital front end (DFE) 317, and an IF/baseband stage 319. The antenna 301, the LNA 303, the SAW filter 305, the mixers 307A and 307B, the filters 309A and 309B, the PGA 313, and the ADC 315 may be substantially similar to similarly named elements described with respect to FIG. 2.

The mixers 307A and 307B may receive input signals from the SAW filter 305 and local oscillator signals at frequency $F_{LO}$, and 90 degree phase difference, to down-convert the received I and Q signals.

The 2-stage polyphase filter 311 may comprise circuitry for providing I and Q signal image rejection of intermediate or baseband signals received from the filters 309A and 309B. This has an advantage over integrating filters prior to the mixers 307A and 307B to reduce image signals because this would require very high Q factors. The 2-stage polyphase filter 311 may comprise a notch frequency of $-F_{IF}$.

In an exemplary scenario, the ADC 315 may comprise a sigma-delta converter. The DFE 317 may comprise circuitry that is operable to decimate the digital signal received from the ADC 315. In an exemplary scenario, the ADC 315 may generate a 1-bit output signal at a frequency $F_{ADC}$, and the DFE 317 may then decimate the received signal by 16 to result in a 6 bit IF signal with a sampling frequency of $F_{LO}/96$.

The IF/baseband stage 319 may comprise circuitry for further processing of the IF or baseband signals received from the DFE 317. For example, if the DFE 317 output signal is an IF signal, the IF/baseband stage 319 may comprise further down-conversion capability. In addition, the IF/baseband stage 319 may comprise filtering and decimation capability for further processing of the received signals.

In operation, the I and Q RF path 300 may receive an RF signal via the antenna 301. The LNA 303 may provide amplification to the received signal before being filtered by the SAW filter 305. The SAW filter 305 may comprise a filter with wide enough bandwidth for both LEO and MEO signals or may be configurable to different frequency ranges. In another exemplary scenario, the SAW filter 305 may comprise a plurality of filters that may be selectively enabled so that only desired signals are passed to the mixers 307A and 307B.

The mixers 307A and 307B may receive the filtered RF signals and local oscillator signals $F_{LO}$ that are 90 degrees out of phase for down-converting I and Q signals to IF or baseband frequencies. The resulting IF or baseband signals may be filtered by the filters 309A and 309B and the 2-stage polyphase filter 311 before being amplified by the PGA 313. The 2-stage polyphase filter 311 may provide image rejection in instances where image signals interfere with the desired signals. The PGA 313 may receive a gain control signal from a processor, such as the CPU 219 described with respect to FIG. 2.

The ADC 315 may convert the amplified and filtered IF/baseband signal to a digital signal for further processing in the digital domain. For example, the DFE 317 and the IF/baseband stage 319 may decimate and filter the digital signal received from the ADC 315. In addition, the IF/baseband stage 319 may comprise a positioning engine for determining the location of the wireless device comprising the I and Q RF front end 300. The position may be determined from accurate timing signals received from a plurality of LEO or MEO satellite signals in conjunction with ephemeris data for the satellites.

In an exemplary scenario, the I and Q RF front end may receive LEO satellite signals. The RSSI may be measured at one or more points along the RF path and an expected MEO signal strength may be determined assuming a similar attenuation for both LEO and MEO signals. As LEO satellites are at much lower altitudes and LEO signals are at a much higher signal strength than MEO signals, LEO signals may be utilized to determine whether sufficient MEO signal strength will be present, such as within an attenuating structure. For example, when the LEO signal strength is decreased below a threshold which indicates that the MEO signal strength, similarly attenuated, would be below a threshold level needed for positioning applications, the MEO RF path or paths may be powered down to conserve power.

Additionally, the LEO RSSI measurement may also be utilized to determine when MEO RF circuitry may be powered up, such as when a wireless device leaves an attenuating structure, and MEO (e.g., GPS) positioning is desired. Thus, the LEO receive paths in the wireless device enable a MEO signal strength measurement without powering up MEO receive path circuitry.

Figure 4:
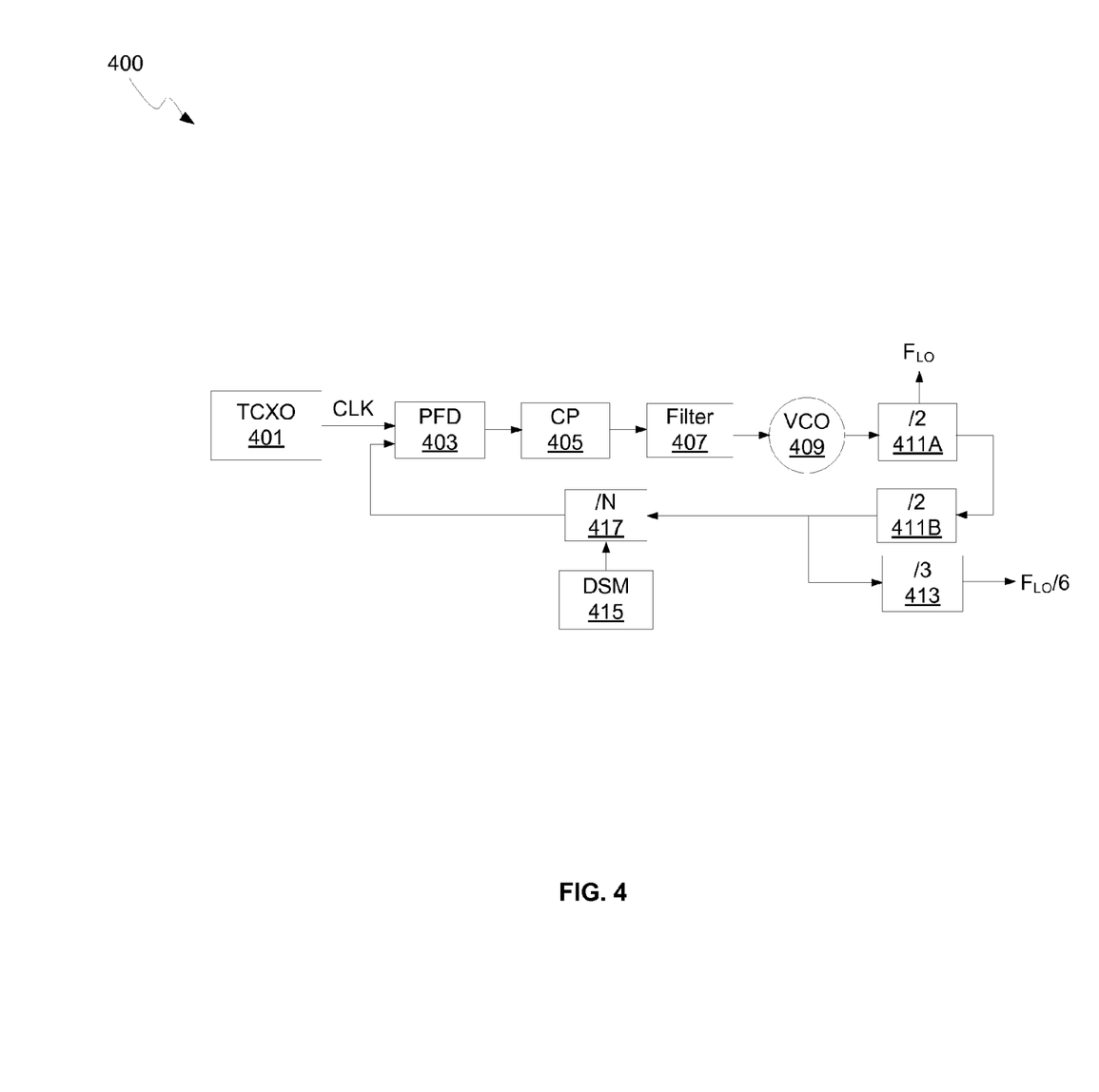
FIG. 4 is a diagram illustrating an exemplary phase locked loop, in accordance with an embodiment of the invention.

FIG. 4 is a diagram illustrating an exemplary phase locked loop, in accordance with an embodiment of the invention. Referring to FIG. 4, there is shown a phase locked loop (PLL) 400 comprising a temperature-compensated crystal oscillator (TXCO) 401, a phase-frequency detector (PFD) 403, a charge pump 405, a loop filter 407, a voltage-controlled oscillator (VCO) 409, divide-by-2 modules 411A and 411B, a divide-by-3 module 413, a delta-sigma modulator (DSM) 415, and a fractional-N divider 417. There is also shown a clock signal CLK and output signals $F_{LO}$ and $F_{LO}/6$.

The TCXO 401 may comprise a crystal oscillator that is capable of providing a stable clock signal, CLK, over an operational temperature range. The TCXO 401 may thus provide the base clock signal for the PLL 400 that is communicated to the PFD 403.

The PFD 403 may comprise circuitry that is operable to sense a phase difference between received input signals, such as the signals received from the TCXO 401 and the fractional-N divider 417. The PFD 403 may output a phase error signal, which is proportional to the phase difference between the two input signals. This error signal may be communicated to the charge pump 405 for adjustment purposes.

The charge pump 405 may comprise circuitry that is operable to adjust a frequency of the VCO 409 via the filter 407. The charge pump 405 may receive an error signal from the PFD 403 that is proportional to the phase difference between input clock signals. Accordingly, the charge pump 405 may generate an output signal that increases or decreases the oscillation frequency of the VCO 409.

The loop filter 407 may comprise a low-pass filter, for example, that filters out noise signals and allows a control signal to pass from the charge pump 405 to the VCO 409. Removing spurious signals and noise fluctuations may increase the stability of the PLL 400.

The VCO 409 may comprise circuitry that is operable to generate a clock signal at a frequency configured by an input voltage. Accordingly, the frequency of the output signal generated by the VCO 409 may be proportional to the magnitude of the voltage of the input signal received from the charge pump 405 via the loop filter 407. The output signal may then be communicated to the divide-by-2 modules 411A and 411B, which may comprise frequency dividers. The divide-by-2 module 411A may generate an output signal $F_{LO}$, which may correspond to the $F_{LO}$, described with respect to FIG. 3, and may also communicate an output signal to the divide-by-2 module 411B for a second halving of the frequency.

The divide-by-2 module 411B may communicate an output signal to the divide-by-3 module 413 and the fractional-N divider 417. The divide-by-3 module 413 may divide the frequency again by 3, resulting in an output signal $F_{LO}/6$. The fractional-N divider 417 may divide the frequency of the input signal by a configurable factor, thereby enabling accurate frequency control of the PLL 400 over a plurality of steps in a frequency range.

The fractional-N divider 417 may receive a modulus control signal from the DSM 415. The value of N may be configured to hop between two values so that the VCO 409 alternates between one locked frequency and the other. The VCO 409 may then stabilize at a frequency that is the time average of the two locked frequencies. By varying the percentage of time that the fractional-N divider 417 spends at the two divider values, the frequency of the locked VCO 409 may be configured with very fine granularity.

In an exemplary scenario, the DSM 415 may enable the PLL 400 to hop between frequencies in a pseudo-random fashion to create noise shaping that reduces the phase noise of the system. The PLL 400 may thus be operable to provide a plurality of stable clock signals based on a TCXO output, and with small incremental steps in output frequency configured by the fractional-N divider 417. The output of the divide-by-3 module 413 may comprise a clock signal for the ADC 315, for example, as described with respect to FIG. 3.

An LEO RF path may be utilized to receive LEO satellite signals. One or more measured RSSI values may be measured in the LEO RF paths to determine whether the expected MEO signal strength is above a threshold needed for positioning purposes. In instances where the LEO RSSI indicates that the MEO signal strength will be below the desired threshold, the PLL 400 utilized for one or more MEO RF paths may be powered down, thereby reducing power consumption of the wireless device.

Figure 5:
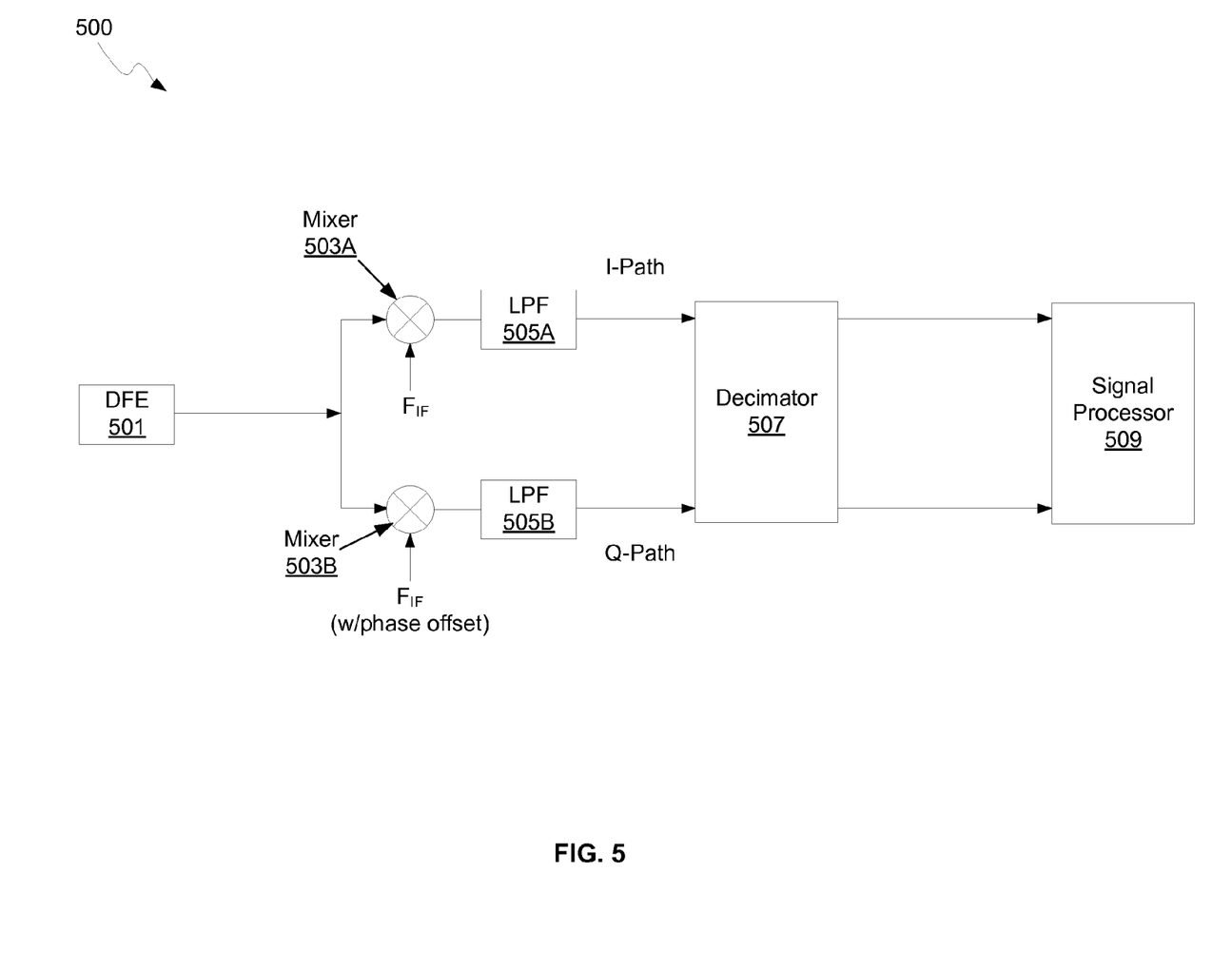
FIG. 5 is a diagram illustrating an exemplary intermediate frequency path, in accordance with an embodiment of the invention.

FIG. 5 is a diagram illustrating an exemplary intermediate frequency path, in accordance with an embodiment of the invention. Referring to FIG. 5, there is shown an IF path 500 comprising a DFE 501, mixers 503A and 503B, low-pass filters 505A and 505B, a decimator 507, and a signal processor 506.

The IF path 500 may correspond to the DFE 317 and the IF/baseband stage 319 as described with respect to FIG. 3, for example. Similarly, the mixers 503A and 503B may be substantially similar to the mixers 307A and 307B of FIG. 3, for example, but with different local oscillator frequencies. For example, the mixers 503A and 503B may receive local oscillator signals FIF, and FIF with a 90 degree phase shift, respectively, to down-convert an IF signal to baseband for further processing by the decimator 507 and the signal processor 509.

The LPFs 505A and 505B may be operable to filter out higher frequency signals while allowing low frequency, or baseband, signals to pass. The decimator 507 may comprise circuitry that is operable to reduce the sampling rate of the digital input signal. For example, the decimator 507 may decimate the sampling rate by a factor of 64, before communicating the resulting signal to the signal processor 509.

The signal processor 509 may comprise a CPU, for example, that may be operable to calculate positioning and navigation information from received satellite signals. For example, the signal processor 509 may be comprise an assisted-GPS positioning engine that is operable to calculate the position of the wireless device 101 from received LEO or MEO satellite signals and stored and/or retrieved ephemeris data.

By enabling the down-conversion of both MEO and LEO signals, the signal processor 509 may determine position and navigation information in areas where MEO signals are too attenuated. Similarly, the signal processor 509 may alternate between MEO and LEO signal data or use data from one signal type to assist in the positioning calculation and/or timing synchronization of the other type of signal. The configuration of a wireless device to receive both LEO and MEO signals may greatly reduce space requirements as the configurable RF path 111 may be integrated on a single chip, as opposed to multiple RF paths, each for a different signal type.

In addition, an RSSI of received LEO signals may be utilized to determine whether the expected MEO signal strength is above a threshold needed for positioning purposes. In instances where the LEO RSSI indicates that the MEO signal strength will be below the desired threshold, portions of the IF path 500 utilized to process MEO signals may be powered down, thereby reducing power consumption of the wireless device.

Figure 6:
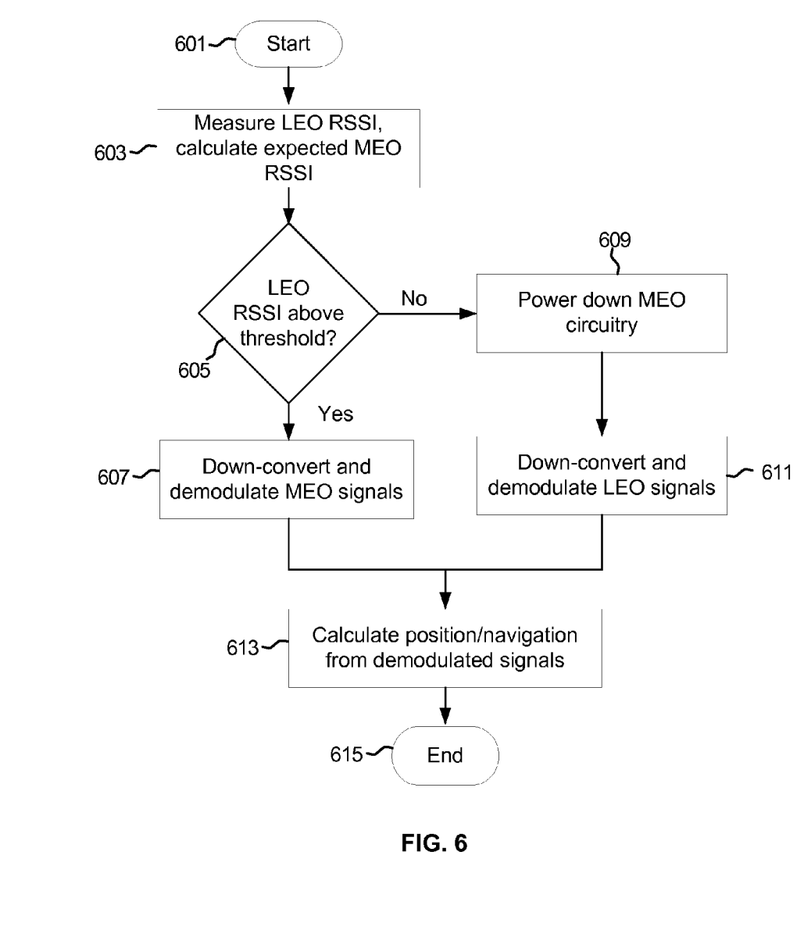
FIG. 6 is a block diagram illustrating exemplary steps for indoor global navigation satellite system detection, in accordance with an embodiment of the invention.

FIG. 6 is a block diagram illustrating exemplary steps for indoor global navigation satellite system detection, in accordance with an embodiment of the invention. The exemplary method illustrated in FIG. 6 may, for example, share any or all functional aspects discussed previously with regard to FIGS. 1-5.

Referring to FIG. 6, after start step 601, in step 603, the wireless device may measure the RSSI at one or more points in the LEO RF path or paths and calculate an expected MEO signal strength. In step 605, if the LEO RSSI is above a threshold indicating sufficient MEO signal strength, the exemplary steps may proceed to step 607 where the MEO RF path and processing circuitry may be configured to receive, filter, amplify, down-convert and demodulate MEO signals.

If, in step 605, the LEO RSSI is below a threshold indicating that insufficient MEO signal strength is present for positioning purposes, the exemplary steps may proceed to step 609 where MEO circuitry may be powered down, followed by step 611 where the received LEO signals may be received, filtered, amplified, down-converted, and demodulated. In an exemplary scenario, where MEO signal positioning is not required, even if it is of sufficient strength, the exemplary steps may still proceed via steps 609 and 611.

In step 613, the demodulated MEO or LEO signals may be utilized to calculate the position of the wireless device and/or used for navigation purposes, followed by end step 615.

In an embodiment of the invention, a method and system may comprise receiving LEO RF satellite signals utilizing a LEO satellite signal receiver path 200, 260, 300, 400, 500 in a wireless communication device 101 comprising the low Earth orbit (LEO) satellite signal receiver path 200, 260, 300, 400, 500 and a medium Earth orbit (MEO) satellite signal receiver path 220, 250, 300, 400, 500. A received signal strength indicator (RSSI) 117, 208A, 208B may be measured for the received LEO RF satellite signals and an expected received MEO signal strength may be calculated based on the measured RSSI 117, 208A, 208B.

A power level of the MEO satellite signal receiver path 220, 250, 300, 400, 500 may be configured based on the calculated MEO signal strength. The MEO satellite signal receiver path may be powered down when the calculated expected MEO signal strength is below a threshold level for MEO positioning purposes. The MEO satellite signal receiver path 220, 250, 300, 400, 500 may be powered up when the calculated expected MEO signal strength increases above a threshold level for MEO positioning purposes.

The RSSI 117, 208A, 208B may be measured at a plurality of points along the LEO satellite signal receiver path 200, 260, 300, 400, 500. RF circuitry 111, 113, clock circuitry 211, 213, 261, $F_{LO}$, 400, $F_{IF}$, and/or processing circuitry 115, 219, 267, 313, 317, 319, 507, 509 in the MEO satellite signal receiver path 220, 250, 300, 400, 500 may be powered down for the configuring of the power level. In-phase and quadrature signals may be processed in the LEO 200, 260, 300, 400, 500 and/or MEO satellite signal receiver paths 220, 250, 300, 400, 500. The wireless communication device 101 may be controlled by a reduced instruction set computing (RISC) central processing unit (CPU) 115, 219, 267, 509.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for indoor global navigation satellite system detection utilizing low Earth orbit satellite signals.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a wireless communication device comprising a low Earth orbit (LEO) satellite signal receiver path and a medium Earth orbit (MEO) satellite signal receiver path:
   receiving LEO RF satellite signals utilizing said LEO satellite signal receiver path;
   measuring a received signal strength indicator (RSSI) for said received LEO RF satellite signals;
   calculating an expected received MEO signal strength based on said measured RSSI;
   configuring a power level of said MEO satellite signal receiver path based on said calculated MEO signal strength.

2. The method according to claim 1, comprising powering down said MEO satellite signal receiver path when said calculated expected MEO signal strength is below a threshold level for MEO positioning purposes.

3. The method according to claim 1, comprising powering up said MEO satellite signal receiver path when said calculated expected MEO signal strength increases above a threshold level for MEO positioning purposes.

4. The method according to claim 1, comprising measuring said RSSI at a plurality of points along said LEO satellite signal receiver path.

5. The method according to claim 1, comprising powering down RF circuitry in said MEO satellite signal receiver path for said configuring of said power level.

6. The method according to claim 1, comprising powering down clock generation circuitry in said MEO satellite signal receiver path for said configuring of said power level.

7. The method according to claim 1, comprising powering down processing circuitry in said MEO satellite signal receiver path for said configuring of said power level.

8. The method according to claim 1, comprising processing in-phase and quadrature signals in said LEO satellite signal receiver path.

9. The method according to claim 1, comprising processing in-phase and quadrature signals in said MEO satellite signal receiver path.

10. The method according to claim 1, wherein said wireless communication device is controlled by a reduced instruction set computing (RISC) central processing unit (CPU).

11. A system for wireless communication, the system comprising:
   one or more circuits for use in a wireless communication device comprising a low Earth orbit (LEO) satellite signal receiver path and a medium Earth orbit (MEO) satellite signal receiver path, said one or more circuits being operable to:
   receive LEO RF satellite signals utilizing said LEO satellite signal receiver path;
   measure a received signal strength indicator (RSSI) for said received LEO RF satellite signals;
   calculate an expected received MEO signal strength based on said measured RSSI;
   configure a power level of said MEO satellite signal receiver path based on said calculated MEO signal strength.

12. The system according to claim 11, wherein said one or more circuits are operable to power down said MEO satellite signal receiver path when said calculated expected MEO signal strength is below a threshold level for MEO positioning purposes.

13. The system according to claim 11, wherein said one or more circuits are operable to power up said MEO satellite signal receiver path when said calculated expected MEO signal strength increases above a threshold level for MEO positioning purposes.

14. The system according to claim 11, wherein said one or more circuits are operable to measure said RSSI at a plurality of points along said LEO satellite signal receiver path.

15. The system according to claim 11, wherein said one or more circuits are operable to power down RF circuitry in said MEO satellite signal receiver path for said configuring of said power level.

16. The system according to claim 11, wherein said one or more circuits are operable to power down clock generation circuitry in said MEO satellite signal receiver path for said configuring of said power level.

17. The system according to claim 11, wherein said one or more circuits are operable to power down processing circuitry in said MEO satellite signal receiver path for said configuring of said power level.

18. The system according to claim 11, wherein said one or more circuits are operable to process in-phase and quadrature signals in said LEO satellite signal receiver path and/or said MEO satellite signal receiver path.

19. The system according to claim 11, wherein said wireless communication device is controlled by a reduced instruction set computing (RISC) central processing unit (CPU).

20. A system for wireless communication, the system comprising:
   one or more circuits for use in a wireless communication device comprising a medium Earth orbit (MEO) satellite signal receiver path and a low Earth orbit (LEO) satellite signal receiver path, said one or more circuits being operable to:
      receive LEO RF satellite signals utilizing said LEO satellite signal receiver path;
      measure a received signal strength indicator (RSSI) for said received LEO RF satellite signals;
      calculate an expected received MEO signal strength based on said measured RSSI;
      powering down circuitry in said MEO satellite signal receiver path when said calculated MEO signal strength falls below a threshold level.

* * * * *